United States Patent [19]

Loncle

[11] Patent Number: 5,510,775
[45] Date of Patent: Apr. 23, 1996

[54] METHOD OF PERSONALIZING AN ELECTRONIC MODULE AND ELECTRONIC CIRCUIT AND MODULE FOR IMPLEMENTING THE METHOD

[75] Inventor: Jean-Pierre Loncle, Muret, France

[73] Assignee: Siemens Aktiengesellschaft, Munich, Germany

[21] Appl. No.: 294,383

[22] Filed: Aug. 23, 1994

Related U.S. Application Data

[63] Continuation-in-part of Ser. No. 778,995, filed as PCT/EP91/00333, Feb. 22, 1991, abandoned.

[30] Foreign Application Priority Data

Mar. 7, 1990 [FR] France .................................... 90 02857

[51] Int. Cl.⁶ .............................. G05B 23/02; H04J 3/02; G06F 7/04
[52] U.S. Cl. .................................. 340/825.07; 340/825.3; 370/85.1
[58] Field of Search ........................... 340/825.07, 825.5, 340/825.52, 825.3, 825.31, 825.33; 370/85.1

[56] References Cited

U.S. PATENT DOCUMENTS

| | | | |
|---|---|---|---|
| 4,377,845 | 3/1983 | Markham et al. | 364/200 |
| 4,430,651 | 2/1984 | Bryant et al. | 340/825.52 |
| 4,492,571 | 1/1985 | Möller et al. | 370/85.1 |
| 4,608,562 | 8/1986 | Minor et al. | 340/825.52 |
| 4,730,251 | 3/1988 | Aakre et al. | 364/200 |
| 4,825,362 | 4/1989 | Minami et al. | 364/200 |
| 4,914,654 | 4/1990 | Matsuda et al. | 370/85.1 |
| 5,109,484 | 4/1992 | Hughes et al. | 395/200 |

FOREIGN PATENT DOCUMENTS

| | | |
|---|---|---|
| 48825 | 4/1982 | European Pat. Off. . |
| 333057 | 9/1989 | European Pat. Off. . |
| 160107 | 7/1986 | Japan . |

OTHER PUBLICATIONS

"Draft Proposal for Recommended Practice: VAN Remote Controlled Switch"; draft Jun. 27–28, 1989; ISO/TC22/SC3/WGI N398E Aug. 1989.

"Draft Standard VAN"; VAN R13–708; Ver. Oct. 31, 1989; ISO/TC22/SC3/WGI N406E, Nov. 1989.

Translation of Japanese Patent Appl.Discl. No. JP 60-200645 (Narihiro Hayashi et al.), Oct. 11, 1994.

Translation of Japanese Patent Appl. Discl. No. JP 1-141440 (Hiroyuki Tsuji et al.), Jun. 2, 1989.

Primary Examiner—Alyssa H. Bowler
Assistant Examiner—Mark H. Rinehart
Attorney, Agent, or Firm—Herbert L. Lerner; Laurence A. Greenberg

[57] ABSTRACT

The method applies to an electronic module comprising a gateway to a communication bus suitable for receiving digital signal frames comprising, in particular, a frame-identifier field and a data field, an identifier discriminator being provided in the module in order to authorize the acquisition by the latter of the data contained in frames comprising a predetermined identifier, this discriminator comprising a memory zone assigned to the latter. A signal frame, the data field of which contains the predetermined identifier, and the identifier field of which contains an image of the initial state of the memory zone, is initially applied to the gateway of the module to the communication bus, in such a way that the identity then established by the discriminator between the initial content of this zone and the identifier field of the frame, authorizes the loading into the said memory zone of the predetermined identifier inscribed in the data field of the frame. Application to an assembly of interconnected electronic modules in a multiplex communications network placed on board an automotive vehicle.

7 Claims, 3 Drawing Sheets

FIG. 2 PRIOR ART

| SOF | IDENTIFIER (IDEN) | EXT | RAK | R/W | RTR | LLC DATA (DAT) | FCS | EOD | ACK | EOP |

CONTROL (COM)

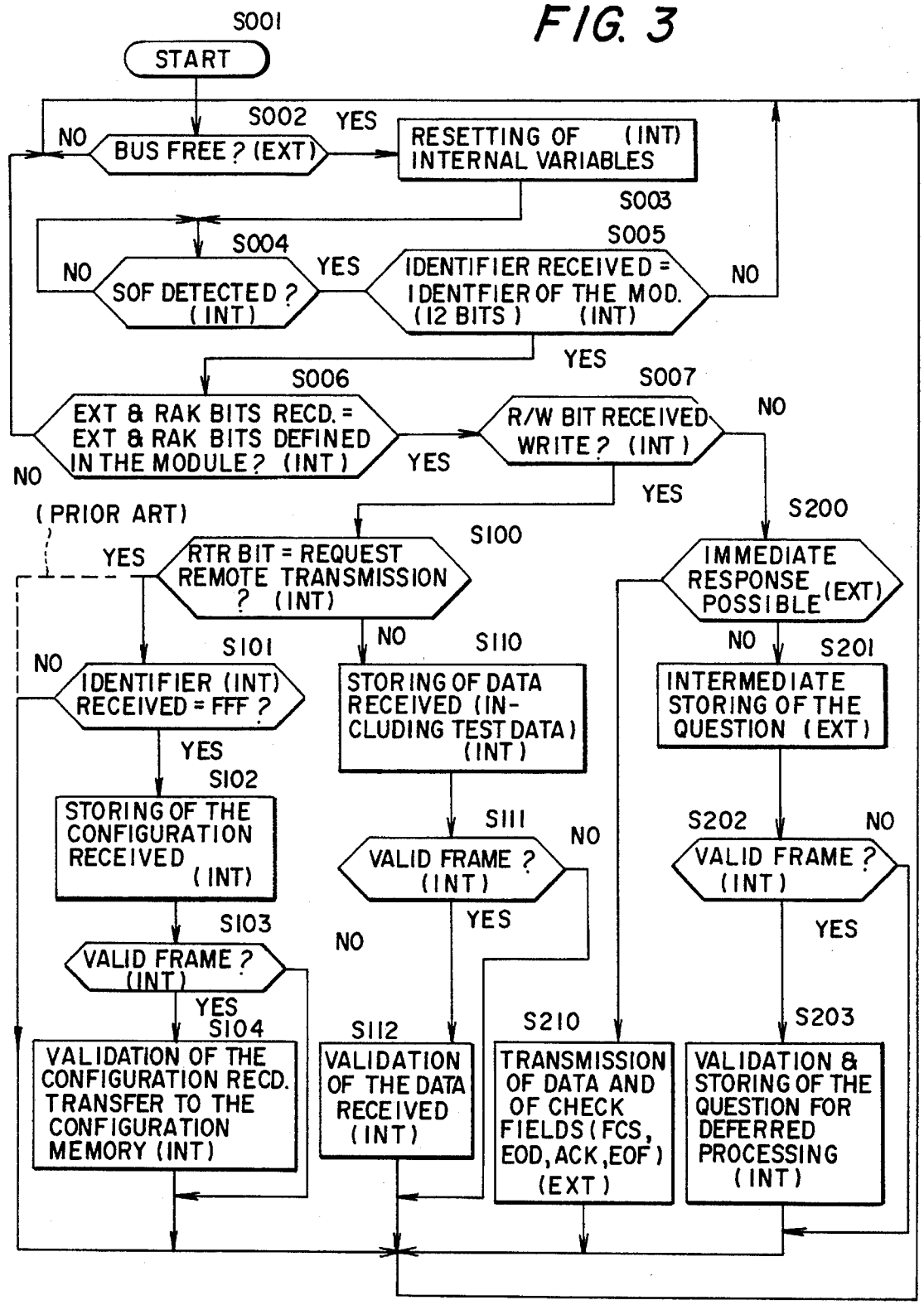

METHOD OF PERSONALIZING AN ELECTRONIC MODULE AND ELECTRONIC CIRCUIT AND MODULE FOR IMPLEMENTING THE METHOD

CROSS-REFERENCE TO RELATED APPLICATION

This is a Continuation-In-Part of application Ser. No. 07/778,995, filed Nov. 7, 1991, now abandoned, which was a Continuation of international application Ser. No. PCT/EP91/00333, filed Feb. 22, 1991.

BACKGROUND OF THE INVENTION

1. Field of the Invention

The present invention relates to a method of personalizing an electronic module, and to an electronic circuit and a module which are designed for the implementation of the method. More particularly, the present invention relates to a method for loading, into an electronic circuit included in the module, of an identifier and of other configuration data, this module forming part of an assembly of modules placed on board an automotive vehicle and interconnected in a local network for multiplex data transmission within the vehicle.

It is currently contemplated to replace the conventional electrical wiring of an automotive vehicle by a serial data transmission bus interconnecting electronic modules for controlling actuators or for acquiring signals received from sensors in the automobile. The standardizing of such an assembly of means forms the subject of a working document referenced ISO/TC22/SC3/WG1 N398E published in June, 1989 by the International Standardization Organization (ISO) and entitled "Draft proposal for recommended practice: VAN remote controlled switch".

Various electronic modules forming part of such an assembly may have the same operating protocols and standards. This is for example the case with modules for acquiring signals delivered by a temperature sensor, which may be perfectly identical from the operational point of view, whether the temperature sensed is that of the air, the cooling water, the engine oil etc. The same is also true of modules for controlling the right and left light units, for example.

It is however necessary to personalize each module in such a way that the module can recognize, out of all the signals conveyed by the bus, those modules which are intended specifically for that module. Following a working document referenced ISO/TC22/SC3/WG1 N406E published in November, 1989 by the abovementioned body and entitled "Draft standard VAN", the signals applied to the communication bus include in the form of frames, each frame comprising, in particular, a "frame-identifier" field used to designate the particular module interrogated, a "control" field which specifies the frame type transmitted, and a data field containing the data to be transmitted.

The identifier field serves to indicate to a particular module whether the data contained in the frame are intended for that module. It is therefore necessary to personalize each module, by loading into a memory zone of the module a predetermined identifier which is tied to it so that this particular module may subsequently recognize, from the communication bus, the signal frames which it should take account of, by comparing the stored identifier with an identifier appearing at the front of each signal frame.

Following a first known method of personalizing the module, the identifier is loaded via specialized input pins provided on an integrated circuit which ensures the decoding of the identifier information received by way of the communication bus. This method exhibits two major disadvantages. Firstly, the personalizing has to be carried out relatively early in the production chain of the module, at the site of the manufacturer of the module. It follows from this that two modules, perfectly identical from an operational point of view, may have different identifiers, which complicates the management of the stocks of these modules, in regard to both manufacture and after-sales service.

The other disadvantage arises because additional pins have to be provided for loading the identifier, since it not possible to disregard the cost of these pins in large-volume manufacturing operations, which must be as inexpensive as possible, as is the case in particular in automotive electronics.

This disadvantage can be eliminated by remotely e.g. at the place of manufacture, loading the identifier into a memory internal to the integrated circuit, during the manufacture of the module. This procedure however has the disadvantage that personalizing the module during manufacture complicates the management of the stocks of modules.

The loading of the identifier could be carried out by configuring the module in programming functioning mode, by application of a particular sequence of stimuli to pins of a connector provided in the module. For reasons of security, it is however necessary that this sequence cannot be reapplied to the module during normal functioning thereof. This solution has the further disadvantage of being relatively complicated to implement, in particular due to the particular constraints which it imposes on the input/output pins of the module.

SUMMARY OF THE INVENTION

The object of the present invention is therefore to provide a method of personalizing an electronic module which is simple, inexpensive and allows later personalizing of the module, in such a way as to simplify the management of the stocks of the non-personalized modules, until the time when the latter are physically installed in the in-service position.

The object of the present invention is also to provide a method which allows simultaneous loading of the identifier into the module and of other data for configuring this module, such as data ensuring "impaired" mode functioning of the items of equipment controlled by the module. Such an impaired mode functioning is automatically substituted for the normal functioning in the case of an anomaly on the communication bus. In an automotive vehicle for example this impaired functioning ensures the maintenance of minimal operating standards, suitable however to ensure the safety of the driver.

The aim of the present invention is further to provide a method which allows execution of operations for testing the functioning of the electronic module, even though the latter has not yet been personalized.

These objects of the invention, as well as others which will emerge in the remainder of the present description, are achieved with a method of personalizing an electronic module comprising a gateway to a communication bus suitable for receiving, in particular, digital signal frames comprising a frame-identifier field and a data field, an identifier discriminator being provided in the module in order to authorize acquisition by the module of data contained in frames comprising a corresponding predetermined identifier, the discriminator comprising a memory zone assigned to the predetermined identifier associated with the module. According to the invention, there is provided a signal frame, having a data field which contains the predetermined identifier, and an identifier field which contains an image of the initial state of the memory zone. The initial state constitutes a "lost" identifier, which is initially applied via the gateway of the module to the communication bus, in such a way that the identity at that time established by the discriminator between the initial content of the memory zone and the identifier field of the frame, authorizes the loading into the memory zone of the predetermined identifier stored in the data field of the frame.

By thus personalizing the module with the aid of signals applied directly to the module, it is possible to perform this personalizing immediately before mounting the module in the in-service position, on an automotive vehicle for example. The management of the non-personalized modules is much simplified thereby because the number of non-personalized modules to be referenced in stock is much smaller than if these modules were personalized.

It is furthermore observed that the method according to the invention is economical because the personalizing of the module does not require the presence on the latter of any connection pin specific to this personalizing.

Following an optional feature of the method according to the invention, the module is loaded with data for configuring the module during the step of loading the module with the predetermined identifier with which it is associated. It is thus possible simply to load into the module data for regulating the impaired-mode functioning of an item of equipment controlled by the module.

Another optional feature of the method according to the invention, is applicable when the digital signal frame transmitted via the communication bus has been received by the module, and the predetermined identifier has been loaded into the module. At this time, there are n unused bits in the data field in the frame which were used to transmit the predetermined identifier. These n unused bits represent $2^n$ combinations of logic states. At least one of these logic states is, according to this other optional feature, compared with the no longer used combination, and can be used to temporarily inhibit the personalizing of the personalizing of the module, and other operations can be executed on the non-personalized module, such as operations for testing the functioning of the module.

The invention also provides an electronic circuit of the module for implementation of the method according to the invention, this circuit comprising means for processing digital signals received by the electronic module into which this circuit is incorporated. The circuit comprises means for connecting the module to the communication bus and means for transmitting and/or receiving signals on a port of the module connected to a peripheral unit. According to the invention, the circuit of the module comprises an identifier discriminator sensitive to a frame containing the "lost" identifier in order to control the loading into the module of the predetermined identifier and of possible configuration data contained in a data field of the frame, into memory means provided in the circuit, and sensitive to a frame containing the predetermined identifier in order to control, in normal functioning, the processing of data contained in a data field of the frame.

In another embodiment of an electronic module according to the invention comprising the circuit defined above, the means of connection to the communication bus can be disconnected from the bus and connected to means provided to ensure the loading of the predetermined identifier and of the possible configuration data into the memory means.

In another variant, the loading of the predetermined identifier and of the possible configuration data can be carried out during the first connection of the module to the communication bus, under the control of a central data-processing unit interconnected with the module via the communication bus and with other modules of the same general type interconnected among themselves by this bus.

Other features which are considered as characteristic for the invention are set forth in the appended claims.

Although the invention is illustrated and described herein as embodied in a method of personalizing an electronic module and electronic circuit and module for implementing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

Other features and advantages of the present invention will emerge on reading the description which follows and examining the attached drawing in which:

BRIEF DESCRIPTION OF THE DRAWINGS

FIG. 2 represents a format of digital signal frames transmitted over a communication bus of an assembly of electronic modules according to the invention, interconnected by this bus, and FIG. 3 is a decision chart showing of the method of personalizing modules, according to the invention.

Figure 1:
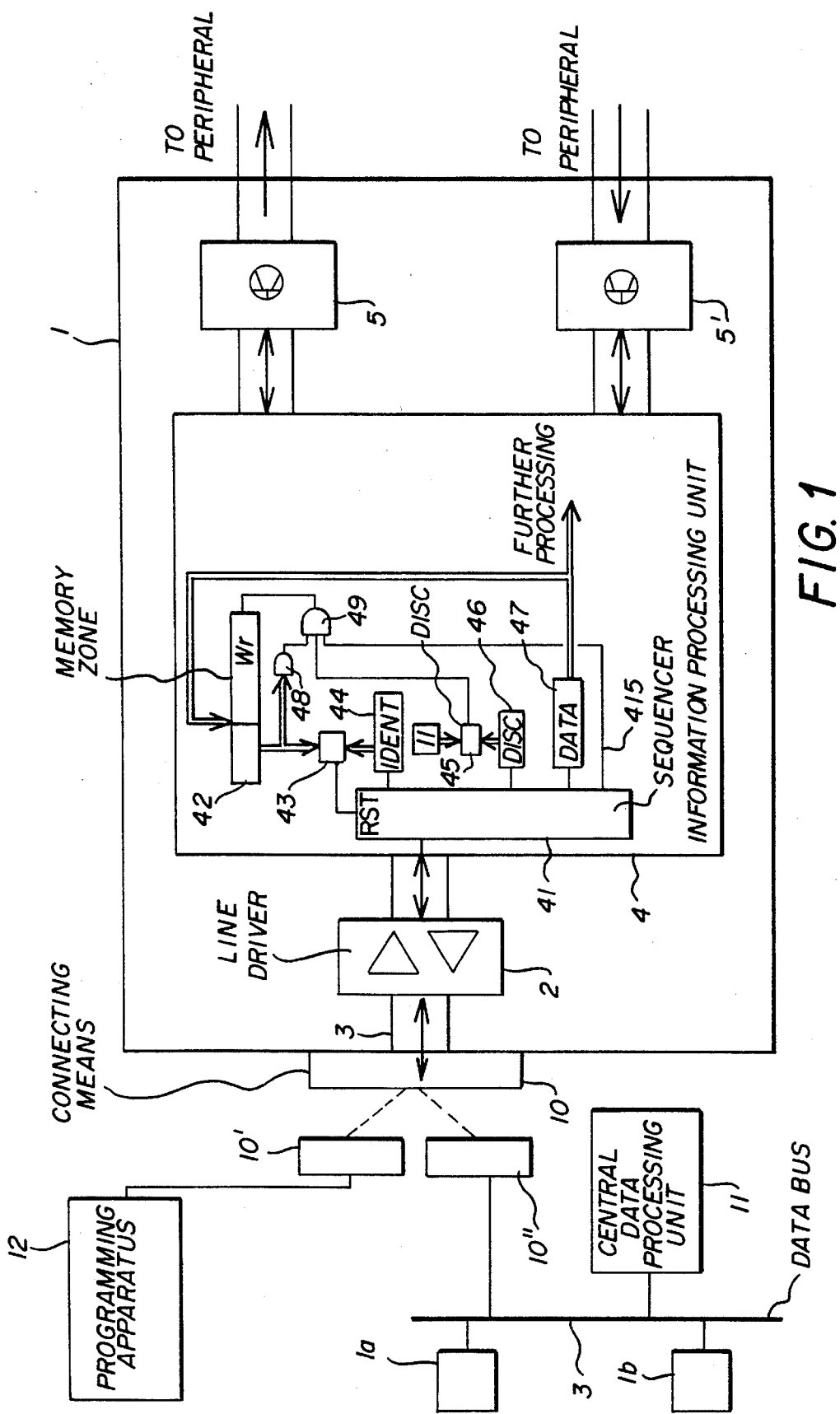
FIG. 1 is a diagram of an electronic module according to the invention.

By way of non-limiting example, the invention will be described in its application to the personalizing of electronic modules placed on board an automotive vehicle and interconnected by a multiplex data transmission bus constituting a local network. Still by way of example, in this regard reference will be made to the local network for an automotive vehicle, described in the abovementioned working documents originating from the ISO, in which this local network is designated by the initials VAN (Vehicle Area Network).

DESCRIPTION OF THE PREFERRED EMBODIMENTS

In FIG. 1 it is seen that a module 1 according to the invention comprises physical means 2 for engaging a communication bus 3 (commonly called a line "driver"), information-processing means 4 in the form of an electronic circuit incorporating the present invention, and means 5, 5' for engaging peripheral units of the vehicle.

Referring to FIG. 2 representing a format of digital signal frames transmitted over the communication bus 3 of a VAN network. To supplement the following description of the structure of these frames, reference can be made to the abovementioned document ISO/TC22/SC3/WG1 N406E, wherein these frames are described in detail.

As seen above, the frames are transmitted serially over the communication bus 3. Each frame is composed of several successive fields diagrammatically represented in FIG. 2 in the form of adjacent blocks. A frame thus contains, firstly, a start of frame delimiter field SOF for marking the start of a frame, and an "identifier" field IDEN used to identify the subject transmitted in the frame or the subject interrogated. The IDEN field makes it possible to identify which module or modules the frame is intended for. This identifier is composed of an arbitrary sequence of binary elements. The sequence can be intended for a particular module or, in contrast, for several modules, if the nature of the information contained in the frame is such that the latter has to reach several modules. The frame continues through a control field (COM) with four bits referenced EXT, RAK, R/W and RTR respectively. This field thus has an extension bit (EXT) reserved for a potential usage, a "request acknowledgement" bit (RAK) which determines whether or not a transmitting module is requesting a receiving module to acknowledge receipt of a correctly received frame, a read/write bit (R/W) which indicates whether the frame transmitted is a request for reading or writing, and a request direct transmission bit (RTR). If the value of this bit is zero, the transmitted frame contains data, whereas if the value of the bit is 1, this value is interpreted by a receiving module as an invitation to transmit.

A data field (DAT) follows the control field. It comprises an integer number of bytes. A signal frame therefore serves essentially to transmit the data contained in the data field to modules clearly addressed by the identifier placed at the front of the frame. The frame is supplemented by various accessory fields. The latter comprise a "frame check sequence" field (FCS), used to guarantee the integrity of the transmitted frames, a "data delimiter" field (EOD) which marks the end of the field transmitted by the transmitter, an "acknowledge receipt" field (ACK) and an "end of frame delimiter" field (EOF).

Referring now to FIG. 3 of the drawing a flow chart shows a method of personalizing an electronic module according to the invention. It is to be understood that the module is intended to form part of an assembly of such modules which are designed to exchange digital signal frames formatted as described above. As has been seen above, this personalizing consists in placing in memory, in the module, at least one specific identifier identifying that module and, possibly, configuration data such as data for regulating "impaired" functioning of an item of equipment controlled by the module, for example.

The flow chart of FIG. 3 illustrates the method according to the invention, which can be executed by means of a hardwired logic network contained in an integrated circuit, the basic functions of which are described in the abovementioned ISO working documents. This circuit is intended to be incorporated into an electronic module. In FIG. 3 each step is marked "INT" or "EXT" to indicate if the respective step is performed internally or externally to the module.

In FIG. 1 a memory zone 42 is provided in such an integrated circuit in order to receive the identifier and, possibly, the configuration data. Before personalizing, the zone reserved for the identifier is "virgin", all the bits being at 1. Twelve bits are reserved for the identifier and this zone therefore initially contains a "lost" identifier, expressed in hexadecimal code as FFF. This identifier is referred to as "lost" since, as will be appreciated below, it cannot be reused once the personalizing of the module is effected. All the non-personalized modules placed on board the automotive vehicle initially comprise in memory, in the zone reserved for the final identifier, the same initial "lost" identifier, namely FFF.

According to the invention, the personalizing of a particular module is achieved by means of a signal frame formatted as described above and comprising, in its identifier field, the lost identifier FFF. It will be appreciated that, if this frame is transmitted over the bus, while each one of the non-personalized modules are interconnected by the communication bus 13, all the non-personalized modules will recognize that frame because the identity of its identifier FFF is equal to the one then contained in their memory zones assigned to the identification. Such an overall recognition therefore does not permit a specific identifier to be entered into a chosen module.

Therefore, according to the invention, the "personalizing" frame is applied via connecting means 10 i.e. the gateway 10 of a particular module to the communication bus 13, while the module is disconnected from the communication bus 3.

To that end an assembly line for mounting the module onto a vehicle is provided. The assembly line is equipped with a communication bus for loading of a particular module with a specific identifier, and possibly with configuration data, which is achieved by connecting the module via its bus gateways 10 and while it is disconnected from the vehicle bus, to an electronic loading "utility" or programming apparatus 12 present at the side of the assembly line.

As seen in FIG. 1, the module 1 can be connected by its connecting means 10 to corresponding connecting means 10' of a programming apparatus 12 which applies to the module a digital signal frame containing the data necessary for the loading of a predetermined identifier and, possibly, of configuration data particular to this module.

Following another possible implementation of the present invention, the module 1 is connected to the bus 3 by the connecting means 10, 10". On the bus, there are already connected several other identical modules (1a, 1b) and a central data processing unit 11. Modules (1a, 1b) have already been personalized, and module 1 is the lone non-personalized module on the bus. This is for example the case when servicing a vehicle where only one module is to be replaced at a time. In this embodiment, the personalizing frame is applied by the central data processing unit 11

In both cases, the personalizing frame is applied to module 1, and passed on, through the line driver 2, to the processing means 4. Therein, the digital frame is received by a sequencer 41 the function of which is to dispatch the serially received bits to several shift registers (44, 46, 47) according to the position of those bits within the frame, and to provide a digital validation signal on its line 415 if the received frame was not corrupted. This function of a sequencer is well known in the art and need not be described furthermore.

Sequencer 41 provides to shift register 44 the twelve bits corresponding to the identifier field of the frame. The content of shift register 44 is compared to the content of the identifier zone of memory 42 by comparison means 43. If the received identifier differ from the memorized identifier, sequencer 41 is reset by comparison means 43 and will wait for a next frame. Meanwhile, the content of identifier zone of memory 42 is provided to an AND gate 48. If the memorized identifier corresponds to the "lost identifier" (i.e. "FFF" —All bits at "1"), AND gate 48 provides a positive signal to the first input of another AND gate 49. If the memorized identifier and the received identifier compare identical, the COM bits are passed on by the sequencer 41 to shift register 46. Comparison means 45 discriminate the status of R/W and RTR bits, and if both have a value "1" provide a positive signal to the second input of AND gate 49. Sequencer 41 then passes on the content of the data field of the frame to shift register 47, where it is temporarily stored. These data are simultaneously applied to the data write inputs of memory 42 and to further processing means (not represented).

Then, if the integrity check of received frame is positive, a positive signal is applied by sequencer 41 through line 415 to the third input of AND gate 49. Therefore, if the three conditions a) Identifier="FFF", b) R/W and RTR bits="1", and c) frame valid, are verified, AND gate 49 applies a positive signal to the Write Enable input Wr of memory 42, authorizing the loading of the content of data shift register 47 into memory 42, thus changing the value of the memorized identifier. Hence, AND gate 48 will no more have all inputs at "1" and no subsequent writing in memory 42 will be allowed. In addition, any other frame received thereafter containing the lost identifier "FFF" will be rejected because it will no more be favorably compared with the new identifier in memory 42.

Returning now to the flow chart of FIG. 3, after a "bus free ?" test step 002, resetting of the internal variables (S 003) and detection of a start of frame delimiter field SOF (S 004), comparison is made at step 005 of the frame identifier which follows the SOF delimiter (bit by bit serial transmission) with the one currently in memory in the module. It is assumed that no predetermined identifier has yet been loaded into the module and it therefore contains the lost identifier "FFF" which can be read into memory.

As seen above, according to the invention, a personalizing frame is transmitted via bus 3 by the central processing unit 11 or by the loading utility 12 connected to the gateways 10 of the module. The frame comprises the identifier FFF in its identification field. A test of step 005 is then positive and another test (S 006) is sequenced to the latter relating to the bits EXT and RAK of the control field COM of the frame transmitted. In the test, these bits are compared with their values placed in memory in the module. In the event of non-identity, the current frame is discarded, since it is judged to be invalid (cf. the protocol described in the abovementioned ISO documents). If there is equality, the next test at step 007 relates to the write/read bit R/W in order to establish whether or not it is "write"-positioned.

In a module personalizing frame of the method according to the invention, this bit is "write"-positioned. The next test at step 100 relates to the last bit of the control field COM, namely the "request remote transmission" or "data transmission" bit RTR. In a personalizing frame, this bit is positioned at "data transmission" for a reason which will be explained below. A discriminator (45 and 46) is installed in the module in order to distinguish this state combination of the R/W and RTR bits.

Referring now to the decision chart of FIG. 3, it is seen that the combination in step 007, with the R/W bit in write mode, and the RTR bit in "request remote transmission" mode in step 100, the next step leads to an "identifier received= FFF ?" test at step 101 which, if it is affirmative, permits at step 102 the storing of the identifier and of the possible configuration data contained in the personalizing frame, in intermediate memories such as shift registers provided in the circuit.

After a test of validity of the frame received (step 103), performed with the aid of the "frame check sequence" field (FCS) containing a cyclic redundancy code used to guarantee the integrity of the frames transmitted, there is a validation of the identifier and of the configuration which are received, and transfer of these data into the memory zones of the module which are provided to this effect in step 104. In this way, the definitive predetermined identifier associated with the module "overwrites" the identifier FFF which could previously have been read from a particular memory zone of an identifier discriminator used in the test for comparing the identifier contained in a frame, with the identifier contained in this memory zone. Similarly, the data for configuring the module are written into another memory zone provided to this effect in the circuit, in order to be used later in the event of the module passing to "impaired" functioning, for example.

It will be observed that only the bit combination: R/W in write mode, RTR in "request remote transmission" mode, permits, according to an important feature of the invention, a possible subsequent personalizing of the module. This is in fact the only state combination of these bits which has no significance during the normal functioning of the module and which, consequently, there is no risk of encountering during normal functioning. In fact, a frame comprising a write-positioned R/W bit is incompatible with a "request remote transmission"-positioned RTR bit, in normal functioning. This results from the fact that the write positioning of the R/W bit is associated with a writing to a receiving module of a datum coming from a transmitting module, while a "request remote transmission" positioning of the RTR bit is interpreted by a receiving module as an invitation to transmit. These two positions are therefore mutually contradictory, in regard to the manner in which the data transfer is performed, and cannot, in normal functioning, be encountered in a same frame.

Advantage is attained from this functioning, in order to build into the personalizing method an additional protection before the recognition of the FFF identifier. Thus, if the R/W and RTR bits are not positioned in such a way as to allow the "identifier received=FFF ?" test, the data contained in the received frame are stored at step 110 in registers before possibly being validated. This is true in the normal functioning of the module, but also before execution of the personalizing procedure. Data can thus be entered into a module, in the absence of the personalizing procedure. This allows in particular execution of tests on the module itself, to verify proper functioning thereof, tests which it is proper to perform on the modules as early as possible, before personalizing and installation in the vehicle, so as to quickly eliminate defective modules.

Of course, if an early procedure for testing the module is not necessary, it is possible, in the method, to omit the tests on the R/W and RTR bits and pass directly to the other essential test of the method, namely the "identifier received =FFF ?" test before validation and recording of an identifier and of configuration data contained in a received frame.

Having thus described the method of personalizing an electronic module according to the invention, which is executed during the installing of the module into a multiplex transmission network such as that described in the preamble of the present description, it is expedient to verify that the thus personalized module is capable of functioning normally within an assembly of such modules. For this-purpose, the decision chart of FIG. 3 is returned to Step 001 while assuming that a signal frame formatted as indicated above is transmitted over the bus, at that time free, and that this frame comprises, in its identification field, a predetermined identifier which occupies at least one of the modules of the network (Steps 003 to 005).

It should be noted in this regard that if the nature of the information to be transmitted is such that several modules are addressees thereof, these modules will have previously been "personalized" with a same identifier so that this multiple transmission is possible.

In the simplest case, the information to be transmitted has only a single addressee. In this case, a single module is personalized to this effect and the transmitted frame is received only by this module.

After the test on the start of frame field SOF, the discriminators of the modules execute the "identifier received= identifier of the module ?" test. For simplicity, it is assumed that this test is positive in a single module only. The other modules then do not react to the frame. Only the module addressed by the frame executes the routine tests on the EXT and RAK bits before testing the R/W bit. If the latter is read positioned, the module transmitting the frame requests another (receiving) module to transmit data to it. According to a procedure explained in the abovementioned ISO working document, referenced ISO/TC22/SC3/WG1 N406 E, a test aiming to advise the transmitting module if the receiving module can respond immediately, is performed, step 200. If such is the case, the latter immediately transmits the response, step 210, over the bus with a data field and suitable check fields (FCS, EOD, ACK, EOF); otherwise there is intermediate storing, step 201, of the question posed by the transmitting module, possible validation of the question (S 202) and storing of the question for deferred processing (S 203).

If the test performed on the R/W bit has revealed a write positioning of this bit, the RTR bit should logically, in normal functioning, be "data transmission" positioned to avoid any confusion with the other alternative (request remote transmission) used only in the phase of personalizing a module. There is then storing of the data received from the frame, possible validation of the latter and finally validation of the data received (Steps 110 to 112).

It is thus observed that the test performed on the R/W and RTR bits and the selection carried out on them in the personalizing phase, does not in any way disturb the normal functioning of the module. It is furthermore recalled that, according to the invention, the identifier FFF used in the personalizing phase is not reused after execution of the personalizing, so as to prevent any confusion.

The module normally comprises means of connection 10 to the data bus, which can possibly be disconnected, means of transmitting 5, 5' and/or of receiving signals on at least one output port connected to a peripheral unit (an actuator for example), and an electronic circuit 4 comprising means 41 for processing frames of digital signals received by way of the means of connection.

The implementation of the personalizing method according to the invention entails the presence in the circuit 4 of the following additional means:
an identifier discriminator, 43, 44 and 48;
a discriminator acting on the R/W and RTR bits, 45 and 46;
additional shift registers 47 for intermediate storing of configuration data; and
memory zones 42 for the definitive storing of the configuration.

Therefore, the method according to the invention makes it possible to personalize a modules without external configuration means, that is to say without specialized configuration pins, since it is expedient to reduce as much as possible the number of pins for reasons of costs.

Of course, the invention is not limited to the embodiment described and presented, which has been given merely by way of example. Thus, the personalizing method following the invention could be implemented in modules interconnected in a multiplex network other than the VAN network described in the abovementioned working documents, with differently structured signal frames but comprising however an address or identification field. Similarly, the execution of tests on the module, prior to the personalizing, could be allowed through discriminations performed on more than two bits, if the frame more generally contains n bits, at least one of the $2^n$ combinations of states of which is not encountered in normal functioning. Furthermore, the personalizing method described above could also be implemented in order to personalize a module to be installed in place of a defective module.

I claim:

1. Method of personalizing at least one of a plurality of electronic modules connected to a communication bus through a gateway, and adapted for receiving digital signal frames, each frame having at least a frame identifier field and a data field, each one of said modules including an identifier discriminator having a memory zone containing at least an identifier identifying the module, said discriminator being adapted to authorize acquisition by the module of the data contained in frames having said identifier in the frame identifier field, wherein the initial content of said memory zone is initially identical for all modules, said method comprising the steps of:

(a) applying initially via the bus gateway a digital signal frame having a frame identifier field corresponding to an image of said initial content of said memory zone and a data field including a predetermined identifier;

(b) determining by means of the discriminator equality between said initial content of said memory zone and the frame identifier field of the digital signal frame; and (c) authorizing, when equality has been established, the loading into said memory zone of the predetermined identifier stored in the data field of the frame, wherein the digital signal frames transmitted by the communication bus further include n predetermined bits capable of forming $2^n$ possible combinations of logic states of which at least a selected one is not used in normal service, said method further comprising the steps of:

(d) comparing the logic state of said n bits present in said digital frame with said at least one selected unused combination, and (e) authorizing loading the predetermined identifier into the memory zone only when the compared combinations are equal, and wherein said digital signal frame has a read/write bit representing a request for respectively reading or writing data, and a RTR bit representing a request for remote transmission and, wherein said unused combination is formed by setting the read/write bit in write position and the RTR bit in remote transmission requesting position.

2. Method according to claim 5, wherein the initial state of the memory zone corresponds to a lost identifier, further comprising the step of rejecting the reuse of the lost identifier after the loading of the predetermined identifier, 3. Method according to claim 2, wherein said initial content of the memory zone used as lost identifier has the hexadecimal value FFF.

4. Method according to claim 1, wherein step (a) is performed by a programming apparatus directly connected to the bus gateway of the module.

5. Method according to claim 1, wherein said module is a lone non-personalized module connected to the bus and wherein step (a) is performed by a central data processing unit connected to said bus.

6. Method according to claim 1, further comprising the step of additionally loading configuration data into the memory zone during the step of loading the predetermined identifier.

7. An electronic module comprising connecting means for connecting a module to an external communication bus, means for managing signals on at least one port of said module connected to peripheral units, and means for processing digital signal frames received by said module, said means for processing digital signal frames comprising:

memory means for storing a predetermined identifier, an identifier discriminator having sensing means for sensing said predetermined identifier in said digital signal frames, and further sensing means for sensing when said predetermined identifier is a lost identifier, means responsive to said further sensing means for controlling loading in said memory means of said predetermined identifier contained in a data field of said digital signal frame, and means for distinguishing a particular combination of n predetermined bits in said digital frame, said particular combination being unused during normal operation, wherein said particular combination has a read/write bit representing a request for respectively reading or writing data and a RTR bit representing a request for remote transmission, and wherein said unused combination is formed by setting the read/write bit in write position and the RTR bit in remote transmission requesting position.

* * * * *